United States Patent [19]

Hattori et al.

[11] Patent Number: 4,741,727
[45] Date of Patent: May 3, 1988

[54] POWER TRANSMISSION V BELT

[75] Inventors: Torao Hattori, Saitama; Minoru Nishimura, Kanagawa; Masaki Gotoh, Shizuoka, all of Japan

[73] Assignees: Honda Giken Kogyo Kabushiki Kaisha, Tokyo; Fukui Shinta Kabushiki Kaisha, Kanagawa, both of Japan

[21] Appl. No.: 943,649

[22] Filed: Dec. 17, 1986

[30] Foreign Application Priority Data

Dec. 23, 1985 [JP] Japan .................................. 60-289856
Dec. 23, 1985 [JP] Japan .................................. 60-289858

[51] Int. Cl.$^4$ ............................................... F16G 5/18
[52] U.S. Cl. .................................. 474/268; 474/242; 384/908
[58] Field of Search ........................ 474/268–272, 474/242, 201, 244; 106/36; 384/907.1, 908–910, 625

[56] References Cited

U.S. PATENT DOCUMENTS

| | | | |
|---|---|---|---|
| 2,960,348 | 11/1960 | Sarowski et al. | 384/908 X |
| 3,006,382 | 10/1961 | Broome | 384/908 X |
| 3,711,171 | 1/1973 | Orkin et al. | 384/907.1 X |
| 4,076,347 | 2/1978 | Meek | 384/908 X |
| 4,431,698 | 2/1984 | Case et al. | 384/908 X |
| 4,507,106 | 3/1985 | Cole, Jr. | 474/215 |

FOREIGN PATENT DOCUMENTS 144843 8/1984 Japan .
101337 6/1985 Japan .

Primary Examiner—James A. Leppink
Assistant Examiner—Thuy M. Bui
Attorney, Agent, or Firm—Irving M. Weiner; Joseph P. Carrier; Pamela S. Burt

[57] ABSTRACT

A power transmission V belt for being trained around driver and driven pulleys for transmitting power therebetween includes a loop-shaped metallic belt and a plurality of metallic V blocks mounted on the metallic belt successively in the longitudinal direction thereof. A a self-lubricating, heat-resistant, wear-resistant hard layer is coated on at least one of a radially inward surface and opposite side surfaces of the metallic belt, and radially outward surface and opposite side surfaces of the V blocks. The loop-shaped metallic belt comprises a stack of metallic members, and the self-lubricating, heat-resistant, wear-resistant hard layer is coated on at least one of confronting surfaces of superimposed ones of the metallic members.

8 Claims, 2 Drawing Sheets

POWER TRANSMISSION V BELT

BACKGROUND OF THE INVENTION

1. Field of the Invention

The present invention relates to a power transmission V belt for use in a continuously variable transmission for an automobile. More particularly, the present invention relates to a power transmission V belt having a loop-shaped metallic belt and a plurality of metallic V blocks mounted on the loop-shaped metallic belt successively in the longitudinal direction thereof and engageable in V-shaped grooves of driver and driven V pulleys.

2. Description of the Relevant Art

There have recently been proposed power transmission V belts for use in automotive continuously variable transmissions, the V belts comprising a loop-shaped or endless metallic belt and a plurality of metallic V blocks mounted on the loop-shaped metallic belt successively in the longitudinal direction thereof. When such a V belt is trained around driver and driven V pulleys, the V blocks are received in the V-shaped grooves of these driver and driven V pulleys.

One example of such a power transmission V belt is disclosed in Japanese Patent Laid-Open Publication No. 60-101337 published June 5, 1985. The loop-shaped metallic belt of the disclosed V belt comprises a plurality of stacked steel belt members. The V belt also includes cylindrical rollers each positioned inwardly of the metallic belt and inserted between adjacent V blocks. These rollers have axes oriented perpendicularly to a plane in which the V belt lies. The V blocks have arcuate recesses defined in their front and rear surfaces in the longitudinal direction of the V belt, each roller being received in a confronting pair of arcuate recesses. There are as many rollers on the V belt as the number of the V blocks. In each confronting pair of the arcuate recesses which receives a roller, one of the recesses has an arcuate roller-receiving surface of a larger radius of curvature than that of the roller, whereas the other arcuate recess has an arcuate roller-receiving surface of a smaller radius of curvature than that of the roller.

When the V blocks engage in the V-shaped groove of the driver pulley, the pulley applies reactive forces radially outwardly to the slanted opposite surfaces of the V blocks for thereby enabling the rollers to be wedged against the arcuate roller-receiving surfaces having a larger radius of curvature. The reactive forces thus applied serve to increase the gap between adjacent V blocks, namely, the radius of an arcuate path along which the V blocks rotate about the axis of the driver pulley. Under this condition, the radially outward surfaces of the V blocks are pressed into frictional engagement with the radially inward surface of the metallic belt, which is therefore forced by the V blocks to rotate with the driver pulley. The loop-shaped metallic belt is now under tension to transmit power from the driver pulley to the driven pulley. The steel belt members of the metallic belt are pressed together while the metallic belt is under tension.

As described above, the V blocks and the metallic belt are held in mutually frictional engagement at the radially outward surfaces of the V blocks and the radially inward surface of the belt. When transmitting torque, therefore, these mutually frictionally engaging surfaces are caused to slip with respect to each other. The mutually frictionally engaging surfaces tend to slip to a larger extent and hence to produce greater heat and wear when a larger load is imposed or when there is a larger torque change. This also holds true for the mutually frictionally engaging surfaces of the steel belt members of the metallic belt which are subject to high tension.

One solution to the above problem would be to supply oil to oil grooves defined in at least one of the frictionally contacting surfaces of the V blocks and the metallic belt, for thereby forming an oil film between the frictionally contacting surfaces. This proposal would be effective when the V blocks are forced against the metallic belt under low pressure. However, the oil film would be apt to be lost under high contact pressure. Another problem would be increased contact pressure, applying excessive stresses.

An alternative solution would be to supply oil under pressure to the contacting surfaces of the V blocks and the metallic belt. It would be extremely difficult, however, to achieve a structure for supply oil under pressure since there are gaps between the blocks.

Slippage of the laminated metallic belt itself would be solved by supplying oil to oil grooves defined in the steel belt members. This arrangement is not preferable for the metallic belt that undergoes high tension since the mechanical strength of the metallic belt would be reduced by the oil grooves.

The present invention has been made in an effort to eliminate the aforesaid drawbacks of the conventional power transmission V belts.

SUMMARY OF THE INVENTION

It is an object of the present invention to provide a power transmission V belt which effectively prevents heat generation and wear even if a metallic belt and V blocks slip with respect to each other under high contact pressure, and hence which is highly durable.

Another object of the present invention is to provide a power transmission V belt which effectively prevents heat generation and wear even if the belt layer members of a laminated metal belt slip with respect to each other under high tension, and hence which is highly durable To achieve the above objects, there is provided a power transmission V belt for being trained around driver and driven pulleys for transmitting power therebetween. The power transmission V belt, comprises a loop-shaped metallic belt having a radially inward surface and opposite side surfaces, a plurality of metallic V blocks mounted on the metallic belt successively in the longitudinal direction thereof and each having a radially outward surface confronting the radially inward surface of the metallic belt and opposite side surfaces, and a self-lubricating, heat-resistant, wear-resistant hard layer coated on at least one of the radially inward and opposite side surfaces of the metallic belt, and the radially outward and opposite side surfaces of the V blocks.

The loop-shaped metal belt comprises a stack of metallic members. The self-lubricating, heat-resistant, wear-resistant hard layer is coated on at least one of the confronting surfaces of superimposed ones of the metallic members.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
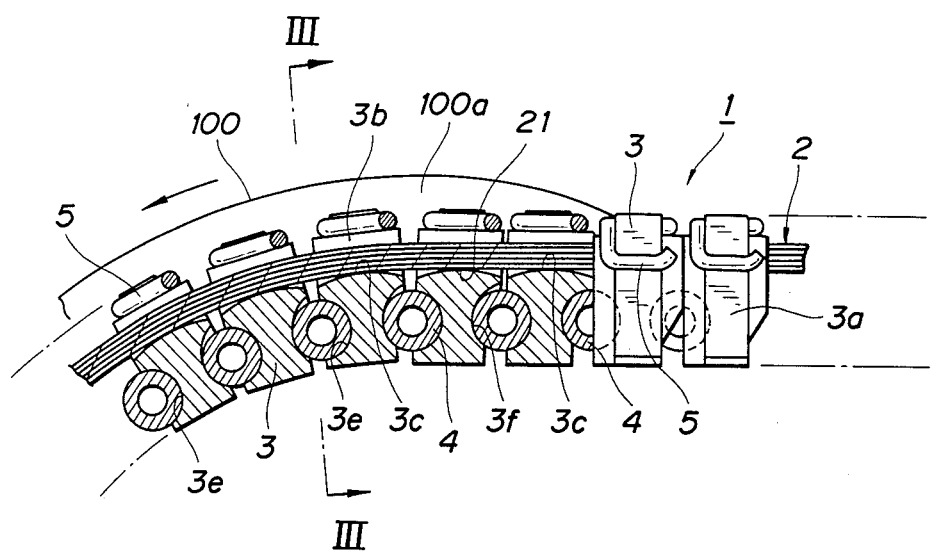
FIG. 1 is a fragmentary side elevational view, partly in cross section, of a power transmission V belt according to the present invention, the V belt engaging a driver pulley.
Figure 2:
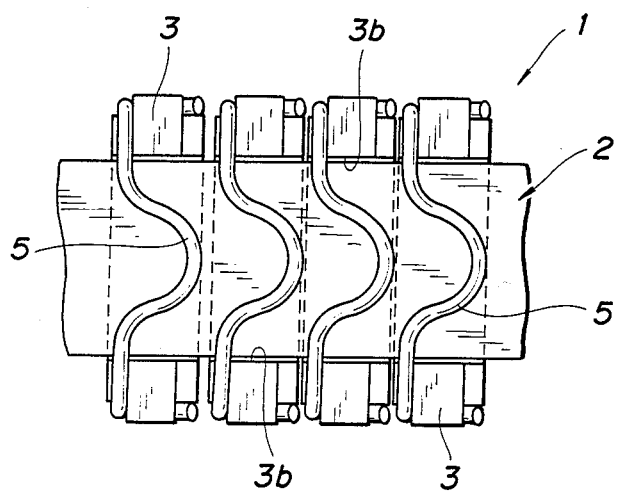
FIG 2 is a fragmentary plan view of the V belt.
Figure 3:
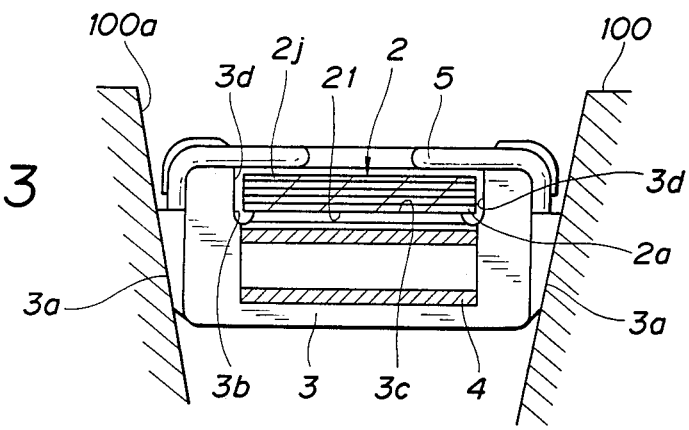
FIG. 3 is a cross-sectional view taken along line III—III of FIG. 1.

FIGS. 1 through 3 show a power transmission V belt, generally designated at 1, according to the present invention. The V belt 1 is trained around a driver V pulley 100 and a driven V pulley (not shown) of an automotive continusouly variable transmission (not shown). The V belt 1 includes a loop-shaped or endless laminated metallic belt 2 comprising ten steel belt members 2a, 2b, . . . , 2j and a plurality of V blocks 3 mounted on the metallic belt 2 successively in the longitudinal direction thereof, the V blocks 3 being made of a sintered metallic material. Preferably, the metallic belt 2 may comprise nine to fifteen steel belt members. Each of the V blocks 3 has slanted opposite side surfaces 3a for engaging V-shaped groove surfaces 100a of the driver V pulley 100, and a recess 3b in which the metallic belt 2 is disposed, the recess 3b opening radially outwardly of the belt loop 2. When the V belt 1 engages the pulley 100, a radially inward surface 21 of the metallic belt 2 abuts against a radially outward surface 3c of the recess 3b.

The V belt also includes cylindrical rollers 4 each positioned inwardly of the metallic belt 2 and inserted between adjacent V blocks 3. These rollers 4 have axes oriented perpendicularly to a plane in which the V belt 1 lies. The V blocks 3 have arcuate recesses 3e, 3f defined in their front and rear surfaces in the longitudinal direction of the V belt 1, each roller 4 being received in a confronting pair of the arcuate recesses. There are as many rollers 4 on the V belt as the number of the V blocks 3. The front arcuate recess 3e has an arcuate roller-receiving surface with a radius of curvature substantially equal to that of the roller 4, whereas the rear arcuate recess 3f has an arcuate roller-receiving surface with a larger radius of curvature than that of the roller 4. A stopper 5 having an inverted channel shape when viewed in front elevation is mounted on each of the V blocks 3 radially outwardly of the metallic belt 2 for preventing the V block 3 from being dislodged from the metallic belt 2. The stopper 5 extends transversely of the V belt 1 and has opposite ends engaging the opposite sides of the V block 3.

When the V blocks 3 engage in the V-shaped groove 100a of the driver pulley 100, reactive forces are applied from the V-shaped grooves 100a radially outwardly to the slanted opposite surfaces 3a of the V blocks 3 for thereby enabling the rollers 4 to be wedged against the arcuate roller-receiving surfaces of the rear recesses 3f. The reactive forces thus applied serve to increase the gap between adjacent V blocks 3, namely, the radius of an arcuate path along which the V blocks 3 rotate about the axis of the driver pulley 100. Under this condition, the radially outward surfaces 3c of the V blocks 3 are pressed into frictional engagement with the radially inward surface 21 of the metallic belt 2, which is therefore forced by the V blocks 3 to rotate with the driver pulley 100. The loop-shaped metallic belt 2 is now under tension to transmit power from the driver pulley 100 to the driven pulley. The steel belt members 2a, 2b, . . . 2j of the metallic belt 2 are pressed together while they are under tension. As described above, the V blocks 3 and the metallic belt 2 are held in mutually frictional engagement at the surfaces 3c, 21, and the steel belt members 2a, 2b, 2f are also held in mutually frictional engagement at their radially inward and outward surfaces. When transmitting torque, therefore, these mutually frictionally engaging surfaces are caused to slip with respect to each other. The mutually frictionally engaging surfaces tend to slip to a larger extent when a larger load is imposed or when there is a larger torque change.

Where the V belt 1 is employed in an automotive continuously variable transmission, a splash of lubricating oil is supplied to the V belt 1 and the driver pulley 100. Since, however, the lubricating oil is not supplied under pressure, it tends to be scattered in areas where contact pressure is high, i.e., between the metallic belt 2 and the V blocks 3 and between the steel belt members 2a, 2b, . . . , 2j, and the oil film is liable to be lost in such areas.

Figure 4:
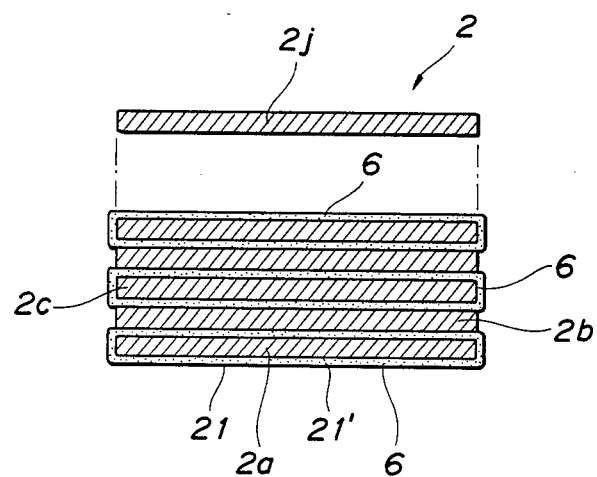
FIG. 4 a transverse cross-sectional view of a laminated metallic belt.

As illustrated in FIG. 4, the metallic belt 2 has surfaces coated with self-lubricating, heat-resistant, wear-resistant thin hard layers 6. More specifically, the innermost steel belt member 2a which contacts the outer surfaces 3c of the V blocks 3, and the steel belt members 2c, 2e, 2g, 2i which are alternately positioned radially outwardly of the steel belt member 2a have their full peripheral surfaces coated with the self-lubricating, heat-resistant, wear-resistant thin hard layers 6.

Figure 5:
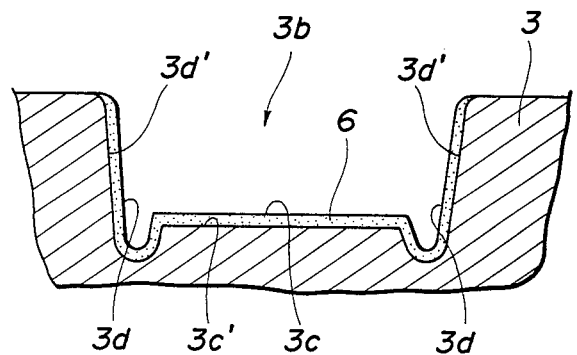
FIG. 5 is a fragmentary cross-sectional view of a V block.

As shown in FIG. 5, the recess 3b of each of the V blocks 3 has its bottom surface 3c and opposite side surfaces 3d formed as a self-lubricating, heat-resistant, wear-resistant thin hard layer 6. The surfaces 3c, 3d contact with the inner and side surfaces of the metallic belt 2.

The layers 6 are made of a material which may be molybdenum disulfide, graphite, fluoroplastics, a metal oxide, synthetic resin, or a complex thereof. The layers 6 are formed by priming the surfaces to be coated, coating the above material on those surfaces, and drying them with air or baking them. The layers 6 can be coated more firmly by baking. Each of the layers 6 is preferably of a thickness in the range of from 5 to 15 microns. Since the V blocks 3 are made of a sintered metallic material, the material coated as the layers 6 can impregnate the porous portion of the V blocks 3 to provide a firmer coating.

The inner surface and opposite side surfaces of the metallic belt 2 and the surfaces 3c, 3d of the recesses 3b of the V blocks 3 are constructed as the self-lubricating thin layers 6. Therefore, heating and wear of these coated surfaces are held to a minimum even if the metallic belt 2 and the V blocks 3 are caused to slip against each other when there is no oil film therebetween due to high contact pressure, with the result that the coated surfaces are highly durable as desired. In order to prevent heat generation and wear due to slippage between the radially inward surface 21' and opposite side surfaces of the metal belt 2 itself and the radially outward surfaces 3c' and opposite side surfaces 3d' of the V blocks 3 themselves, it is enough for either the metallic belt 2 or the V blocks 3 to have surfaces coated with layers 6, particularly where the metallic belt 2 is constructed as a single layer.

The alternate steel belt members 2a, 2c, 2e, 2g, 2i have their full peripheral surfaces coated with the self-lubricating thin layers 6. Consequently, even if slippage between the steel belt members 2a, 2b, ..., 2j is increased when the oil film is lost under high tension, heat generation and wear are minimized, resulting in a desired degree of durability of the steel belt members 2a, 2b,..., 2j. In order to prevent heat generation and wear due to slippage between the steel belt members 2a, 2b, ..., 2j, it suffices for at least one of the confronting surfaces of superimposed ones of the steel belt members 2a–2j surfaces 2j to be coated with a layer 6. It is, however, possible to coat layers 6 on the radially inward surfaces and opposite side surfaces of all of the steel belt members 2a–2j themselves. In such a case, each of the layers 6 is of a relatively wide channel shape when viewed in front elevation. Only the inner peripheral surfaces of the respective steel belt members may be coated with layers 6. Where the clearances or thicknesses of the respective steel belt members are suitably selected to impose a larger tension on the innermost steel belt member, the inner and outer peripheral surfaces of only the innermost steel belt member may be coated with layers 6.

With the aforesaid arrangement, the V belt 1 is capable of transmitting large torques since it can withstand high contact pressure and high tension.

The principles of the present invention are also applicable to a V belt of the type in which no rollers are interposed between adjacent V blocks. Furthermore, at least one of the radially outward surface of the loop-shaped metallic belt 2 or the radially inward surface of each stopper 5 may be coated with a hard layer 6.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A power transmission V belt for being trained around driver and driven pulleys for transmitting power therebetween, said power transmission V belt comprising:
   a loop-shaped metallic belt having a radially inward surface and opposite side surfaces;
   a plurality of metallic V blocks mounted on the metallic belt successively in the longitudinal direction thereof and each having a radially outward surface confronting said radially inward surface of the metallic belt and opposite side surfaces; and
   a hard layer self-lubricating, heat-resistant, wear-resistant, material coated on at least one of said radially inward surface and opposite side surfaces of said metallic belt, and on the radially outward surface and opposite side surfaces of said V blocks.

2. A power transmission V belt according to claim 1, wherein said loop-shaped metallic belt comprises a stack of metallic members, and said self-lubricating, heat-resistant, wear-resistant hard layer is coated on at least one of confronting surfaces of superimposed ones of the metallic members.

3. A power transmission V belt according to claim 1, wherein said hard layer is coated on said radially inward surface and said opposite side surfaces of said metallic belt.

4. A power transmission V belt according to claim 1, wherein said hard layer is coated on said radially outward surfaces and said opposite side surfaces of said V blocks.

5. A power transmission V belt according to claim 4, wherein said V blocks are made of a sintered metallic material.

6. A power transmission V belt according to claim 1, wherein said hard layer is coated on said radially inward surface and said opposite side surfaces of said metallic belt, and on said radially outward surfaces and said opposite side surfaces of said V blocks.

7. A power transmission V belt according to claim 1, wherein said hard layer is made of a material selected from the group consisting of molybdenum disulfide, graphite, fluoroplastics, a metal oxide, synthetic resin, and a complex thereof.

8. A power transmission V belt according to claim 1, wherein said hard layer has a thickness ranging from 5 to 15 microns.

* * * * *

UNITED STATES PATENT AND TRADEMARK OFFICE
CERTIFICATE OF CORRECTION

PATENT NO. : 4,741,727

DATED : May 3, 1988

INVENTOR(S) : HATTORI et al.

It is certified that error appears in the above-identified patent and that said Letters Patent is hereby corrected as shown below:

```
Column 2, line 44, after "durable" insert a period.
Column 3, line 10, after "Fig. 4" insert --is--;
         line 21, correct the spelling of --continuously--.
Column 4, line 11, after "2a, 2b," change "2f" to -- ...,2j--.
Column 5, line 15, after "2a-2j" delete "surfaces 2j".
In the Abstract, line 5, after "A" delete "a".
```

Signed and Sealed this

Tenth Day of January, 1989

Attest:

DONALD J. QUIGG

*Attesting Officer*  *Commissioner of Patents and Trademarks*